US007553921B2

(12) United States Patent
Suzuki et al.

(10) Patent No.: US 7,553,921 B2
(45) Date of Patent: Jun. 30, 2009

(54) POLYETHER POLYOL COMPOSITION AND USE THEREOF

(75) Inventors: Chitoshi Suzuki, Kashima-gun (JP); Hiroki Fukuda, Kashima-gun (JP); Shigeru Ikai, Kashima-gun (JP)

(73) Assignee: Asahi Glass Company, Limited, Tokyo (JP)

( * ) Notice: Subject to any disclaimer, the term of this patent is extended or adjusted under 35 U.S.C. 154(b) by 282 days.

(21) Appl. No.: 11/188,888

(22) Filed: Jul. 26, 2005

(65) Prior Publication Data

US 2005/0267279 A1 Dec. 1, 2005

Related U.S. Application Data

(63) Continuation of application No. PCT/JP04/000737, filed on Jan. 28, 2004.

(30) Foreign Application Priority Data

Jan. 28, 2003 (JP) ............................ 2003-019062

(51) Int. Cl.

*B01J 27/26* (2006.01)
*C08G 18/10* (2006.01)
*C08G 18/48* (2006.01)
*C07C 271/10* (2006.01)
*C07C 271/08* (2006.01)
*C07C 43/04* (2006.01)
*C07C 43/11* (2006.01)

(52) U.S. Cl. ........................ 528/76; 502/152; 502/175; 528/48; 528/59; 252/182.24; 252/182.29; 560/25; 560/26; 560/115; 560/158; 568/620; 568/621; 568/623

(58) Field of Classification Search .................. 528/59, 528/52, 55, 48, 76; 502/175, 152; 521/174; 560/25, 26, 115, 158; 568/620, 621, 623; 252/182.29, 182.24

See application file for complete search history.

(56) References Cited

U.S. PATENT DOCUMENTS

| | | | | |
|---|---|---|---|---|
| 4,877,906 | A * | 10/1989 | Harper | 568/621 |
| 5,096,993 | A | 3/1992 | Smith et al. | |
| 5,099,075 | A * | 3/1992 | Katz et al. | 568/621 |
| 5,340,902 | A | 8/1994 | Smith et al. | |
| 5,919,888 | A | 7/1999 | Lawrey et al. | |
| 5,998,574 | A * | 12/1999 | Fishback et al. | 528/417 |
| 6,063,897 | A | 5/2000 | Le-Khac et al. | |
| 6,313,060 | B1 * | 11/2001 | Sugiyama et al. | 502/175 |
| 6,359,101 | B1 * | 3/2002 | O'Connor et al. | 528/66 |
| 6,538,043 | B1 * | 3/2003 | Bronnum et al. | 521/174 |
| 2002/0198099 | A1 * | 12/2002 | Ooms et al. | 502/100 |

FOREIGN PATENT DOCUMENTS

| | | | |
|---|---|---|---|
| EP | 0 090 445 | A2 | 10/1983 |
| JP | 5-170857 | | 7/1993 |
| JP | 9-132630 | | 5/1997 |
| JP | 2002-513818 | | 5/2002 |
| WO | WO 99/14258 | | 3/1999 |
| WO | WO 01/34297 | A2 | 5/2001 |

* cited by examiner

*Primary Examiner*—Rabon Sergent
*Assistant Examiner*—Benjamin Gillespie
(74) *Attorney, Agent, or Firm*—Oblon, Spivak, McClelland, Maier & Neustadt, P.C.

(57) ABSTRACT

A polyether polyol composition, the reactivity of which with a polyisocyanate can be controlled, to thereby obtain an isocyanate group-terminated prepolymer having excellent storage stability. A polyether polyol composition comprising a polyether polyol obtained by a ring-opening polymerization of an alkylene oxide in the presence of a composite metal cyanide complex catalyst, and a phosphoric acid compound comprising a phosphoric acid selected from orthophosphoric acid, polyphosphoric acid and polymetaphosphoric acid, and/or a partial ester of such a phosphoric acid, wherein the polyether polyol composition contains metals derived from the composite metal cyanide complex catalyst in an amount of from 1 to 30 ppm based on the polyether polyol, and the above phosphoric acid compound in an amount of from 0.5 to 100 ppm based on the polyether polyol.

16 Claims, 1 Drawing Sheet

POLYETHER POLYOL COMPOSITION AND USE THEREOF

TECHNICAL FIELD

The present invention relates to a polyether polyol produced by a composite metal cyanide complex catalyst and use thereof.

BACKGROUND ART

Heretofore, a polyether polyol as a material for polyurethane elastomers, adhesives, sealants, etc., has been produced by polymerizing an alkylene oxide such as ethylene oxide or propylene oxide by means of an initiator having active hydrogen atoms. As a typical polymerization catalyst for an alkylene oxide, a composite metal cyanide complex (hereinafter referred to also as a DMC catalyst) is known. The DMC catalyst is a catalyst comprising an organic ligand and a metal salt and is represented by a compound having an organic ligand, water and $ZnCl_2$ coordinated on zinc hexacyano cobaltate ($Zn_3[Co(CN)_6]_2$).

In recent years, it has been reported that the catalytic life of a DMC catalyst is remarkably prolonged by the use of tert-butyl alcohol as an organic ligand (JP-A-4-145143). Further, JP-A-2000-513389 discloses that by employing a highly active DMC catalyst using an organic ligand such as tert-butyl alcohol, it is possible to reduce the amount of the catalyst to be used, and it is possible to eliminate a step for removal of the DMC catalyst after the production of a polyether polyol.

And, JP-A-9-132630 discloses that it has been found that a polyether polyol having from 10 to 1,000 ppm of a residue of a DMC catalyst, or a composition comprising such a polyether polyol and an antioxidant, has a storage stability, and with an isocyanate group-terminated prepolymer prepared by using such a polyether polyol or composition, the storage stability is not poor. Further, in JP-A-9-132630, a triester of phosphorous acid is exemplified as an antioxidant. However, in order to obtain a sufficient storage stability, it is required to use the antioxidant in a large amount as much as at least 500 ppm.

On the other hand, it is known, for example, by JP-A-6-502674 (U.S. Pat. No. 3,391,101) that a phosphorus compound is used in a purification step after preparing a polyether polyol by means of a DMC catalyst having a relatively low activity, using glyme or the like as an organic ligand. JP-A-6-502674 discloses a process wherein a polyether polyol is produced using about 500 ppm, based on the finally formed polyether polyol, of a DMC catalyst, and then the DMC catalyst is decomposed by an alkali catalyst such as an alkali metal hydroxide, followed by neutralization treatment by means of a phosphoric acid compound, whereupon the neutralized salt is removed. Thus, it has already been known to use a phosphoric acid compound to neutralize an alkali used to deactivate the DMC catalyst in the process for removing the DMC catalyst.

Further, JP-A-5-170857 proposes that a thermally stable prepolymer can be produced in the presence of from 100 ppm to 10% of an ester of phosphorus acid during the preparation of the prepolymer by using the obtained polyether polyol.

DISCLOSURE OF THE INVENTION

The present invention is to solve the above-described problems and to provide a polyether polyol which is a polyether polyol capable of eliminating a step of removing the DMC catalyst and whereby, when formed into an isocyanate group-terminated prepolymer, the storage stability will not be deteriorated.

The present invention is the following invention which will solve the above-mentioned problems.

A polyether polyol composition comprising a polyether polyol obtained by ring-opening polymerization of an alkylene oxide in the presence of a composite metal cyanide complex catalyst, and a phosphoric acid compound comprising a phosphoric acid selected from orthophosphoric acid, polyphosphoric acid and polymetaphosphoric acid, and/or a partial ester of such a phosphoric acid, characterized in that the polyether polyol composition contains metals derived from the composite metal cyanide complex catalyst in an amount of from 1 to 30 ppm based on the polyether polyol, and the above phosphoric acid compound in an amount of from 0.5 to 100 ppm based on the polyether polyol.

A polyurethane resin obtained by reacting the above polyether polyol composition with a polyisocyanate.

An isocyanate group-terminated prepolymer obtained by reacting the above polyether polyol composition with a polyisocyanate.

A method for producing a polyether polyol composition, which comprises producing a polyether polyol by ring-opening polymerization of an alkylene oxide in the presence of a composite metal cyanide complex catalyst in such an amount that the metals derived from the composite metal cyanide complex catalyst would be from 1 to 30 ppm based on the finally formed polyether polyol, and then adding a phosphoric acid compound comprising a phosphoric acid selected from orthophosphoric acid, polyphosphoric acid and polymetaphosphoric acid, and/or a partial ester of such a phosphoric acid, in an amount of from 0.5 to 100 ppm based on the polyether polyol, without via a step of removing the composite metal cyanide complex catalyst.

A method for producing a polyurethane, characterized by producing a polyether polyol by ring-opening polymerization of an alkylene oxide in the presence of a composite metal cyanide complex catalyst in such an amount that the metals derived from the composite metal cyanide complex catalyst would be from 1 to 30 ppm based on the finally formed polyether polyol, then adding a phosphoric acid compound comprising a phosphoric acid selected from orthophosphoric acid, polyphosphoric acid and polymetaphosphoric acid, and/or a partial ester of such phosphoric acid, in an amount of from 0.5 to 100 ppm based on the polyether polyol, without via a step of removing the composite metal cyanide complex catalyst, to obtain a polyether polyol composition, and further reacting the polyether polyol composition with a polyisocyanate.

A method for producing an isocyanate group-terminated prepolymer, characterized by producing a polyether polyol by ring-opening polymerization of an alkylene oxide in the presence of a composite metal cyanide complex catalyst in such an amount that the metals derived from the composite metal cyanide complex catalyst would be from 1 to 30 ppm based on the finally formed polyether polyol, then adding a phosphoric acid compound comprising a phosphoric acid selected from orthophosphoric acid, polyphosphoric acid and polymetaphosphoric acid, and/or a partial ester of such phosphoric acid, in an amount of from 0.5 to 100 ppm based on the polyether polyol, without via a step of removing the composite metal cyanide complex catalyst, to obtain a polyether polyol composition, and further reacting the polyether polyol composition with a polyisocyanate.

EFFECTS OF THE INVENTION

By using the polyether polyol produced by the composite metal cyanide complex catalyst of the present invention, the reaction rate with a polyisocyanate can be controlled, and it is possible to produce a prepolymer or a polyurethane having a high storage stability.

BEST MODE FOR CARRYING OUT THE INVENTION

Composite Metal Cyanide Complex Catalyst

Figure 1:
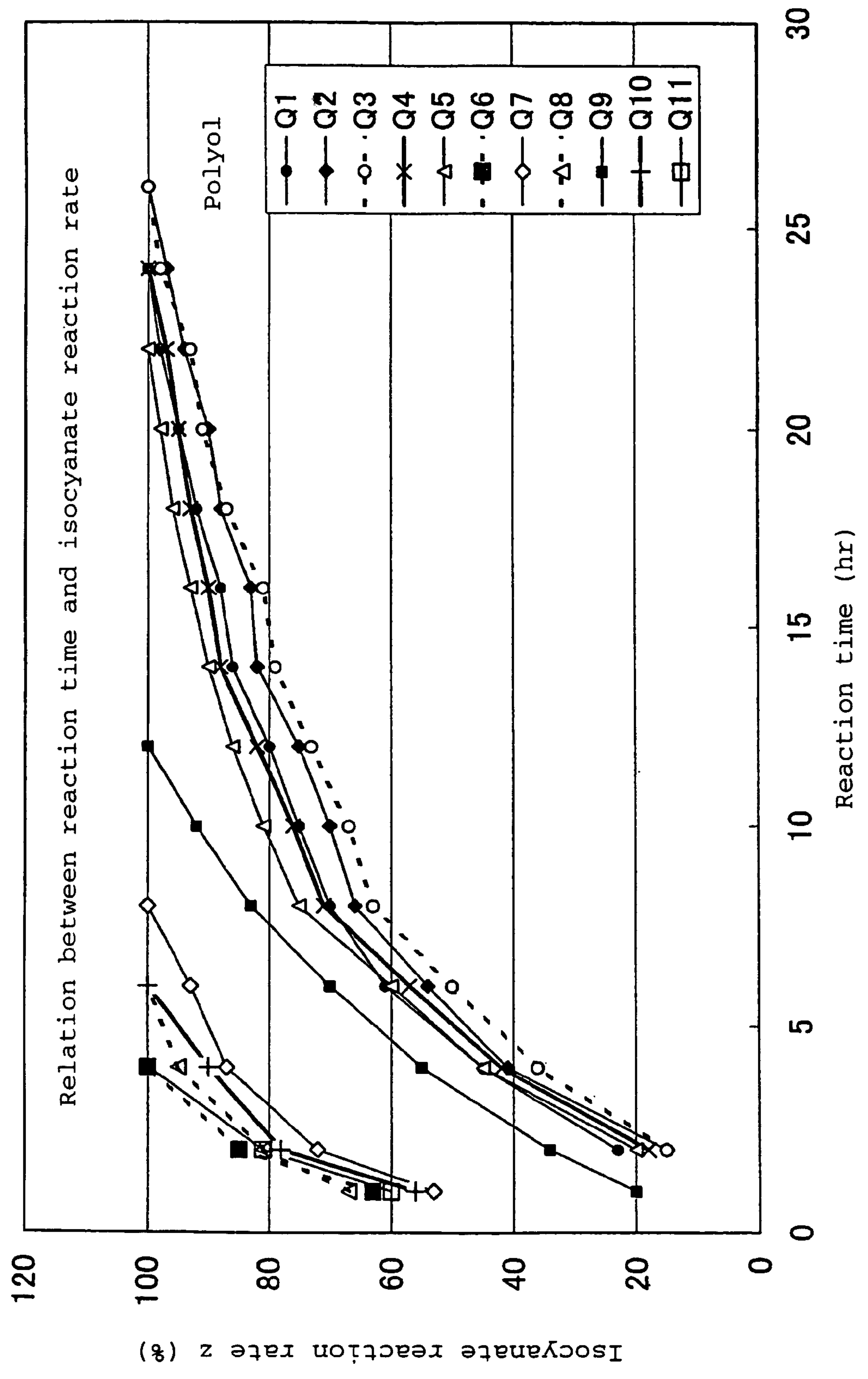
FIG. 1 shows the relation between the reaction time (hr) and the isocyanate reaction rate z (%).

In the present invention, a polyether polyol composition contains metals derived from a composite metal cyanide complex catalyst in an amount of from 1 to 30 ppm, preferably from 2 to 20 ppm, particularly preferably from 3 to 15 ppm, based on the polyether polyol. If the metals derived from the composite metal cyanide complex catalyst are in an amount exceeding 30 ppm, control of the reaction at the time of producing a polyurethane from a polyether polyol, tends to be difficult. Further, the stability of a prepolymer obtained from such a polyether polyol tends to be poor, and the mechanical properties of a polyurethane tend to be adversely affected. On the other hand, if their amount is less than 1 ppm, the viscosity of the polyol tends to be remarkably high, whereby the handling tends to be difficult.

Composite Metal Cyanide Complex Catalyst

A composite metal cyanide complex catalyst is typically represented by the following formula (1).

$$M^1_a[M^2_b(CN)_c]_d e(M^1_f X_g) h(H_2O) i(R) \quad (1)$$

(wherein each of $M^1$ and $M^2$ is a metal, X is a halogen atom, R is an organic ligand, and each of a, b, c, d, e, f, g, h and i, is a number which is variable depending upon the atomic balances of metals, the number of organic ligands to be coordinated, etc.)

In the above formula (1), $M^1$ is preferably a metal selected from Zn(II), Fe(II), Fe(III), Co(II), Ni(II), Mo(IV), Mo(VI), Al(III), V(V), Sr(II), W(IV), W(VI), Mn(II), Cr(III), Cu(II), Sn(II) and Pb(II), particularly preferably Zn(II) or Fe(II). In the above formula, $M^2$ is preferably a metal selected from Fe(II), Fe(III), Co(II), Co(III), Cr(II), Cr(III), Mn(II), Mn(III), Ni(II), V(IV) and V(V), particularly preferably Co(III) or Fe(III). II, III, IV and V in the above brackets represent the atomic valences.

In the above formula (1), R is an organic ligand and is preferably at least one compound selected from the group consisting of an alcohol, an ether, a ketone, an ester, an amine and an amide. As such an organic ligand, a water-soluble one is preferred. Specifically, one or more compounds selected from tert-butyl alcohol, n-butyl alcohol, iso-butyl alcohol, tert-pentyl alcohol, iso-pentyl alcohol, N,N-dimethyl acetamide, glyme (ethylene glycol dimethyl ether), diglyme (diethylene glycol dimethyl ether), triglyme (triethylene glycol dimethyl ether), ethylene glycol mono-tert-butyl ether, isopropyl alcohol and dioxane, may be mentioned. The dioxane may be 1,4-dioxane or 1,3-dioxane and is preferably 1,4-dioxane.

A particularly preferred organic ligand is one or more compounds selected from tert-butyl alcohol, tert-pentyl alcohol and ethylene glycol mono-tert-butyl ether, and tert-butyl alcohol or a mixture of tert-butyl alcohol with ethylene glycol mono-tert-butyl ether, is most preferred.

The composite metal cyanide complex catalyst can be produced by a known production method. For example, it can be produced by a method wherein an organic ligand is coordinated to a reaction product obtained by reacting a metal halide with an alkali metal cyano metalate in an aqueous solution, then the solid component is separated, and the separated solid component is washed with an organic ligand aqueous solution, or a method wherein a metal halide is reacted with an alkali metal cyano metalate in an organic ligand aqueous solution, and the obtained reaction product (solid component) is separated, and the separated solid component is washed with an organic ligand aqueous solution.

As the metal for the metal halide, one exemplified above as $M^1$ may be mentioned, and Zn(II) or Fe(II) is particularly preferred. The most preferred as the metal halide is $ZnCl_2$. As the metal constituting the cyano metalate or the alkali metal cyano metalate, one exemplified above as $M^2$ may be mentioned, and Co(III) or Fe(III) is particularly preferred. A preferred specific example of the alkali metal cyano metalate is $Na_3[Co(CN)]_6$ or $K_3[Co(CN)]_6$. Further, instead of the alkali metal cyano metalate, $H_3[Co(CN)_6]$ may also be used.

Further, the reaction product obtained by the above method may be washed and then subjected to filtration, and the cake (solid component) thereby obtained may be dried to prepare a composite metal cyanide complex catalyst. Otherwise, the organic ligand aqueous solution containing the composite metal cyanide complex catalyst after washing the reaction product, may be dispersed in a polyol, and then, an excess amount of water and the organic ligand may be distilled off to prepare a composite metal cyanide complex catalyst in a slurry form.

As the polyol to be used here, a polyether polyol may be mentioned. The polyether polyol is preferably a polyether polyol having from 2 to 12 hydroxyl groups and a molecular weight of from 300 to 5,000 which is obtainable by ring-opening polymerization of an alkylene oxide with a polyhydric alcohol such as ethylene glycol, propylene glycol, diethylene glycol, dipropylene glycol, trimethylol propane or glycerol in the presence of an alkali catalyst or a cationic catalyst. Such a polyether polyol may be used also as an initiator at the time of subsequently producing a polyether polyol.

The number of hydroxyl groups is preferably from 2 to 8, particularly preferably from 2 to 3. The alkylene oxide is preferably an alkylene oxide having at least 2 carbon atoms, and propylene oxide, 1,2-butylene oxide, 2,3-butylene oxide, epichlorohydrin, oxetane or tetrahydrofuran may, for example, be mentioned. They may be used in combination as a mixture of two or more of them. Propylene oxide is preferred.

Polyether Polyol

In the present invention, the polyether polyol is produced by ring-opening polymerization of an alkylene oxide in the presence of the above composite metal cyanide complex catalyst. In such a ring-opening polymerization reaction, an initiator is usually used.

As the initiator, a polyhydric alcohol such as ethylene glycol, propylene glycol, diethylene glycol, dipropylene glycol, trimethylol propane or glycerol, or a polyether monool or polyether polyol having from 2 to 12 hydroxyl groups and a molecular weight of from 300 to 5,000, which is obtainable by ring-opening polymerization of an alkylene oxide with such a polyhydric alcohol in the presence of an alkali catalyst or a cationic catalyst, may be mentioned. The number of hydroxyl groups is preferably from 2 to 8, particularly preferably from 2 to 3. The hydroxyl value of the initiator is at least twice, preferably at least three times the hydroxyl value of the polyether polyol as the final product. Further, as the initiator, a polyester polyol or a polycarbonate polyol may also be used.

The initiator may be introduced continuously to the reactor together with an alkylene oxide and/or the catalyst, to carry out the polymerization of the alkylene oxide. As the initiator which may be used in such a case, a polyhydric alcohol having a low molecular weight may be used. As such a polyhydric alcohol having a low molecular weight, a polyhydric alcohol having a molecular weight of at most 400, such as ethylene glycol, propylene glycol, diethylene glycol, dipropylene glycol, trimethylol propane or glycerol, may be mentioned.

With respect to the alkylene oxide to be added to the initiator, the alkylene oxide is preferably an alkylene oxide having at least 3 carbon atoms, and propylene oxide, 1,2-butylene oxide, 2,3-butylene oxide, epichlorohydrin, oxetane, or tetrahydrofuran may, for example, be mentioned. They may be used in combination as a mixture of two or more of them. Propylene oxide is preferred. Further, it is difficult to let ethylene oxide react by itself, but it may be polymerized by adding it to the reaction system as mixed with an alkylene oxide having at least 3 carbon atoms. A particularly preferred alkylene oxide is propylene oxide or a combination of propylene oxide and ethylene oxide. Further, a cyclic ester such as lactone may be used in combination with the alkylene oxide.

The polyether polyol in the present invention is preferably a polyether polyol which is not subjected to a step of removing the catalyst after ring-opening polymerization of the alkylene oxide.

Accordingly, it is preferred to use the composite metal cyanide complex catalyst in an amount such that the metals derived from the composite metal cyanide complex catalyst would be from 1 to 30 ppm based on the finally formed polyether polyol. The amount is preferably from 2 to 20 ppm, particularly preferably from 3 to 15 ppm.

If the metals derived from the composite metal cyanide complex catalyst are in an amount exceeding 30 ppm, the cost for the catalyst increases. Further, it tends to be difficult to control the reaction at the time of producing a polyurethane from the polyether polyol. Further, the stability of the prepolymer obtained from the polyether polyol tends to be poor, which adversely affects the mechanical properties of the polyurethane. Further, if their amount is less than 1 ppm, the viscosity of the polyol tends to remarkably increase, whereby the handling tends to be difficult.

Further, the catalyst may be introduced into the reaction system all at once at the beginning or may be introduced sequentially in a divided fashion.

The average number of functional groups in the polyether polyol of the present invention is preferably from 2 to 12, more preferably form 2 to 8, further preferably from 2 to 4. Further, the hydroxyl value is preferably from 5 to 100, more preferably from 5 to 70, particularly preferably from 5 to 35. Further, the total unsaturated degree is preferably at most 0.07 meq/g, particularly preferably at most 0.03 meq/g. There is no particular lower limit, but the lower limit is preferably 0.003 meq/g.

Phosphoric Acid Compound

The polyether polyol composition in the present invention contains a phosphoric acid compound comprising a phosphoric acid selected from orthophosphoric acid, polyphosphoric acid and polymetaphosphoric acid, and/or a partial ester of such a phosphoric acid, in an amount of from 0.5 to 100 ppm based on the polyether polyol.

If the content of the phosphoric acid compound exceeds 100 ppm, it tends to be difficult to control the reaction of the polyol with a polyisocyanate. Further, also in a case where it is less than 0.5 ppm, it tends to be difficult to control the reaction of the polyol with a polyisocyanate. The content of the phosphoric acid compound is preferably at least 1 ppm. Further, it is preferably at most 50 ppm, particularly preferably at most 30 ppm.

Orthophosphoric acid ($H_3PO_4$) is a compound represented by $[O{=}P(OH)_3]$.

Further, polyphosphoric acid is represented by the following formula (2):

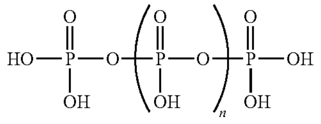

(2)

(In the formula (2), n is an integer.)

As n, from 0 to 10 is preferred, and n is particularly preferably from 0 to 5. Most preferred is pyrophosphoric acid ($H_4P_2O_7$) wherein n is 0, triphosphoric acid ($H_5P_3O_{10}$) wherein n is 1, or tetraphosphoric acid ($H_6P_4O_{13}$) wherein n is 2.

Further, polymetaphosphoric acid is represented by the formula (3):

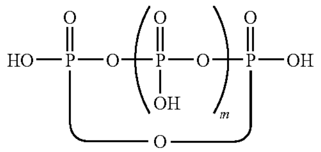

(3)

(In the formula (3), m is an integer.)

As m, from 1 to 10 is preferred, and m is particularly preferably from 1 to 5. Most preferred is trimetaphosphoric acid ($H_3P_3O_9$) wherein m is 1, or tetrametaphosphoric acid ($H_4P_4O_{12}$) wherein m is 4.

Each phosphoric acid selected from orthophosphoric acid, polyphosphoric acid and polymetaphosphoric acid is a polybasic acid wherein the number of OH groups bonded to phosphorus atoms is at least 3, particularly preferably a polybasic acid wherein the number of OH groups bonded to phosphorus atoms is from 3 to 6.

Further, in the present invention, a partial ester of such a phosphoric acid may also be used. The partial ester of a phosphoric acid means one wherein not all OH groups in the phosphoric acid are esterfied, and some OH groups remain. Namely, for example, a partial ester of orthophosphoric acid means a monoester of orthophosphoric acid or a diester of orthophosphoric acid.

The ester is preferably an ester having a $C_{1-18}$ hydrocarbon group, more preferably one having a $C_{1-18}$ alkyl group, a $C_{1-18}$ cycloalkyl group or a $C_{1-18}$ aryl group.

The above alkyl group may, for example, be a methyl group, an ethyl group, a propyl group, a butyl group, a hexyl group, an octyl group, a 2-ethylhexyl group, a decyl group, a dodecyl group or a stearyl group. Further, it may be an alkyl group having an aromatic group as a substituent, such as a benzyl group. The above aryl group is preferably a $C_{1-10}$ aryl group, and a phenyl group may be mentioned. Further, it may be a group having an alkyl group as a substituent, such as a toluyl group or a xylyl group. The above cycloalkyl group may, for example, be a cyclopentyl group or a cyclohexyl group.

In a method for producing a prepolymer by reacting a polyether polyol with a polyisocyanate, if a residue of a composite metal cyanide complex catalyst remains in the polyether polyol, control of the reaction is considered to be difficult, as the metal component derived from such a residue of the composite metal cyanide complex catalyst works as a catalyst for the urethane-forming reaction of the polyisocyanate with the polyether polyol. In the present invention, the phosphoric acid compound to be used is characterized in that it is a pentavalent phosphorus compound and it has OH groups, whereby it is considered that by the oxidation reaction thereof, the remaining composite metal cyanide complex catalyst is deactivated.

Further, the effects of the present invention cannot be obtained with a phosphorus compound such as phosphorous acid or a phosphite. This is believed attributable to the fact that a phosphorus compound such as phosphorous acid or a phosphite has a strong reducing property, whereby deactivation of the DMC catalyst tends to be difficult.

Further, even with a pentavalent phosphorus compound, if it is a phosphorus compound having no OH group, such as a triester of orthophosphoric acid, the effects of the present invention cannot be obtained. Thus, it is considered that such a phosphorus compound has no acidic proton and is not accordingly effective for deactivation of the DMC catalyst by oxidation.

In the present invention, the phosphoric acid compound and/or a partial ester thereof is particularly preferably at least one member selected from orthophosphoric acid, a monoalkyl ester of orthophosphoric acid and a dialkyl ester of orthophosphoric acid.

In the present invention, it is preferred that after the ring-opening polymerization of an alkylene oxide in the presence of the composite metal cyanide complex catalyst, the above phosphoric acid compound is added without via a step of removing the catalyst.

The phosphoric acid compound may be added as it is or as diluted with water or another solvent, and it is particularly preferred to add it in the form of an aqueous solution. In a case where water or another solvent is used, such water or a solvent is preferably removed from the polyol by drying under reduced pressure.

Uses

The polyether polyol composition of the present invention has an effect such that the reactivity with an isocyanate can easily be controlled. A polyether polyol containing a metal component derived from a DMC catalyst even in a very small amount, has had a problem that the reactivity with an isocyanate tends to be high, and the reaction rate can hardly be controlled. However, according to the present invention, such a problem can be solved. Especially when it is reacted with a polyisocyanate compound to obtain an isocyanate group-terminated prepolymer, such an isocyanate group-terminated prepolymer tends to be hardly gelled thereby to provide an effect such that the isocyanate group-terminated prepolymer is excellent in the storage stability. The present invention provides an isocyanate group-terminated prepolymer obtained by reacting the above polyether polyol composition with a polyisocyanate.

The polyisocyanate which may be used, may, for example, be an aromatic polyisocyanate such as tolylene diisocyanate, diphenylmethane diisocyanate or polymethylene polyphenyl isocyanate, an aliphatic polyisocyanate such as hexamethylene diisocyanate, xylylene diisocyanate, dicyclohexylmethane diisocyanate, lysine diisocyanate or tetramethylxylylene diisocyanate, an alicyclic polyisocyanate such as isophorone diisocyanate, or a modified product thereof.

The modified product may, for example, be a prepolymer modified product which is a reaction product of a low molecular weight diol with a low molecular weight triol, a buret product which is a reaction product with water, or a trimer having an isocyanurate skeleton.

The isocyanate group-terminated prepolymer can be produced by reacting a stoichiometrically excess amount of a polyisocyanate to the polyether polyol composition. It can be produced by thermally reacting the polyoxyalkylene polyol composition with the polyisocyanate at a temperature of from 60 to 100° C. for from 1 to 30 hours in a dry nitrogen stream in the presence or absence of a solvent and optionally in the lo presence of a urethane-forming catalyst. The urethane-forming catalyst is preferably an organometallic compound of e.g. tin, lead or titanium. Particularly preferred is an organic tin compound, such as dibutyltin dilaurate, dibutyltin dioctoate or stannous octoate.

The isocyanate group-terminated prepolymer of the present invention can be used for known uses. It can be used for a humidity curable composition which will be cured by a reaction with moisture in air, a two-part curable composition to be reacted with a curing agent such as a polyamine, a polyether polyol or a low molecular weight polyol, a casting polyurethane elastomer, or other applications.

The present invention also provides a polyurethane resin obtained by reacting the above polyether polyol composition with a polyisocyanate. Such a polyurethane resin can be produced by a known method, and a curing agent such as a polyamine or a low molecular polyol, or the above mentioned urethane-forming catalyst may optionally be used.

EXAMPLES

Now, the present invention will be described in further detail with reference to Examples and Comparative Examples. However, it should be understood that the present invention is by no means restricted by such Examples. Here, polyol X is a polyol having a hydroxyl value of 74.8, obtained by addition-polymerizing propylene oxide (hereinafter PO) to dipropylene glycol by means of a KOH catalyst, followed by purification by a known method.

Production of Composite Metal Cyanide Complex Catalyst

Reference Example 1

An aqueous solution comprising 10.2 g of zinc chloride and 10 g of water, was put into a 500 mL flask. An aqueous solution comprising 4.2 g of potassium hexacyano cobaltate ($K_3CO(CN)_6$) and 75 g of water, was dropwise added to the aqueous zinc chloride solution in the above flask over a period of 30 minutes with stirring at a rate of 300 rpm (number of rotations/min). During this period, the mixed solution in the flask was maintained to be 40° C. After completion of the dropwise addition of the aqueous potassium hexacyano cobaltate solution, the mixture in the flask was further stirred for 30 minutes, whereupon a mixture comprising 40 g of ethylene glycol mono-tert-butyl ether (hereinafter referred to simply as EGMTBE), 40 g of tert-butyl alcohol (hereinafter referred to simply as TBA), 80 g of water and 0.6 g of polyol X, was added, followed by stirring at 40° C. for 30 minutes and further at 60° C. for 60 minutes. The obtained mixture was subjected to filtration under pressure (0.25 MPa) by means of a circular filter plate having a diameter of 125 mm and a filter paper for fine particles (No. 5C, manufactured by ADVANTEC) to separate a solid (a cake) containing the composite metal cyanide complex.

Then, the obtained cake containing the composite metal cyanide complex was transferred to a flask, and a mixture comprising 18 g of EGMTBE, 18 g of TBA and 84 g of water, was added, followed by stirring for 30 minutes, whereupon pressure filtration was carried out under the same conditions as above, to obtain a cake. The obtained cake was transferred to a flask, and a mixture comprising 54 g of EGMTBE, 54 g of TBA and 12 g of water, was further added, followed by stirring for 30 minutes, to obtain a liquid (slurry) having the composite metal cyanide complex catalyst (hereinafter referred to also as the DMC catalyst) dispersed in the EGMTBE-TBA-water mixed solvent.

About 5 g of this slurry was put into a flask, roughly dried in a nitrogen stream and then vacuum-dried at 80° C. for 4 hours. The solid was weighed, whereby the concentration of the composite metal cyanide complex as the solid catalyst component, was 4.65 mass %. To the rest of the slurry, 120 g of polyol X was added and mixed, and then, the volatile component was distilled off at 80° C. for 3 hours and further at 115° C. for 3 hours, to obtain a slurry-form catalyst (catalyst Y1). The concentration of the solid catalyst component in the slurry was 3.85 mass %.

Reference Example 2

An aqueous solution comprising 10.2 g of zinc chloride and 10 g of water was put into a 500 mL flask. An aqueous solution comprising 4.2 g of potassium hexacyano cobaltate and 75 g of water was dropwise added to the above aqueous zinc chloride solution in the flask over a period of 30 minutes with stirring at a rate of 300 rpm (the number of rotations/min). During this period, the mixed solution in the flask was maintained at 40° C. After completion of the dropwise addition of the aqueous potassium hexacyano cobaltate solution, the mixture in the flask was further stirred for 30 minutes, whereupon a mixture comprising 80 g of TBA, 80 g of water and 0.6 g of polyol X, was added, followed by stirring at 40° C. for 30 minutes and further at 60° C. for 60 minutes. The obtained mixture was subjected to filtration in the same manner as in Reference Example 1, to separate a solid (a cake) containing the composite metal cyanide complex.

Then, the obtained cake containing the composite metal cyanide complex was transferred to a flask, and a mixture comprising 36 g of TBA and 84 g of water was added, followed by stirring for 30 minutes, whereupon pressure filtration was carried out under the same conditions as above, to obtain a cake. The obtained cake was transferred to a flask, and a mixture comprising 108 g of TBA and 12 g of water, was further added, followed by stirring for 30 minutes, to obtain a liquid (slurry) having the composite metal cyanide complex catalyst dispersed in the TBA-water mixed solvent.

About 5 g of this slurry was put into a flask, roughly dried in a nitrogen stream and then vacuum-dried at 50° C. for 4 hours. The solid was weighed, whereby the concentration of the composite metal cyanide complex as the solid catalyst component was 4.43 mass %. To the rest of the slurry, 120 g of polyol X was added and mixed, and then, the volatile component was distilled off under reduced pressure at 50° C. for 2 hours and further at 60° C. for 5 hours, to obtain a slurry-form catalyst (catalyst Y2). The concentration of the solid catalyst component in the slurry was 3.92 mass %.

Production of Polyol in 5 L Reactor

In Examples A1 to A11 (Examples A1 to A5 are working examples of the invention, and Examples A6 to A11 are comparative examples), polyols Q1 to Q11 were produced. As the reactor, a 5 L pressure resistant reactor made of stainless steel and equipped with a stirrer, was used.

The natures of the obtained polyols are shown in Table 1. Here, the hydroxyl value and the total unsaturated degree were measured by methods in accordance with JIS K1557. Mw/Mn was measured by gel permeation chromatography (GPC) as calculated as polystyrene. The catalyst residue was represented by the content of Zn and Co.

Example A1

Into the reactor, 587 g of polyol X as an initiator and 5.8 g of catalyst Y1 (containing 0.225 g of the solid catalyst component) were put. The interior of the reactor was flushed with nitrogen, and then the internal temperature was raised to 120° C., and 59 g of PO was added and reacted. After the pressure in the reactor once increased as PO was added, decreased, PO was supplied at a rate of 20 g/min in an amount of 2,600 g, and thereafter, PO was supplied at a rate of 10 g/min in an amount of 1,300 g. During the supply of PO into the reactor, the internal temperature of the reactor was maintained at about 120° C., and stirring was carried out at a rotational speed of 220 rpm to carry out a polymerization reaction. After completion of the reaction, heating and stirring were carried out at 120° C. for further 60 minutes to let unreacted PO react as far as possible. Then, deaeration under reduced pressure at 70° C. was carried out for 30 minutes, and then, nitrogen gas was introduced to return the interior of the reactor to normal pressure.

To the obtained polyol, an aqueous solution containing 85% of orthophosphoric acid ($H_3PO_4$) was added, followed by vacuum-drying at 120° C. to obtain polyol Q1 containing 3.0 ppm of orthophosphoric acid.

Example A2

Polyol Q2 was produced in the same manner as in Example A1 except that the content of orthophosphoric acid was changed to 5.5 ppm.

Example A3

Polyol Q3 was produced in the same manner as in Example A2 except that as the catalyst, 5.7 g of catalyst Y2 (containing 0.225 g of the solid catalyst component) was used, and instead of orthophosphoric acid, a mixture (AP-8: 2-ethylhexyl acid phosphate, average molecular weight: 266, manufactured by Daihachi Kagaku Kogyo KK) comprising bis(2-ethylhexyl) phosphate [O═P(OH)($OC_8H_{17}$)$_2$] and mono(2-ethylhexyl) phosphate [O═P($OC_8H_{17}$)(OH)$_2$], was used and put in an amount such that the amount of phosphorus compound would be 15 ppm, based on the polyol.

Example A4

A polyol was produced in the same manner as in Example A1 except that as the catalyst, 9.3 g of catalyst Y1 (containing 0.36 g of the solid catalyst component) was used.

To the obtained polyol, an aqueous solution containing 85% of orthophosphoric acid was added, followed by vacuum drying at 120° C. to obtain polyol Q4 containing 8.5 ppm of orthophosphoric acid.

Example A5

A polyol was produced in the same manner as in Example A1 except that as the catalyst, 2.32 g of catalyst Y1 (containing 0.090 g of the solid catalyst component) was used.

To the obtained polyol, an aqueous solution containing 85% of orthophosphoric acid was added, followed by vacuum drying at 120° C. to obtain polyol Q5 containing 2.0 ppm of orthophosphoric acid.

Example A6

Polyol Q6 was produced in the same manner as in Example A1 except that no orthophosphoric acid was added.

Example A7

Polyol Q7 was produced in the same manner as in Example A4 except that no orthophosphoric acid was added.

Example A8

Polyol Q8 was produced in the same manner as in Example A5 except that no orthophosphoric acid was added.

Example A9

Polyol Q9 was produced in the same manner as in Example A1 except that instead of orthophosphoric acid, phosphorus acid ($H_3PO_3$) was used.

Example A10

Polyol Q10 was produced in the same manner as in Example A3 except that instead of orthophosphoric acid, bis(2-ethylhexyl)phosphite [O═PH($OC_8H_{17}$)$_2$] was used.

Example 11

Polyol Q11 was produced in the same manner as in Example A4 except that instead of orthophosphoric acid, tris(2-ethylhexyl)orthophosphate [O═P($OC_8H_{17}$)$_3$] was used.

TABLE 1

| Ex. | Polyol | Hydroxyl value (mgKOH/g) | Mw/Mn | Kinetic viscosity at 25° C. (mPa · s) | Unsaturated degree (meq./g) | Catalyst residue (ppm) | Content of phosphoric acid compound (ppm) |
|---|---|---|---|---|---|---|---|
| A1 | Q1 | 11.2 | 1.18 | 4650 | 0.0076 | 14.1 | 3.0 |
| A2 | Q2 | 11.4 | 1.20 | 4670 | 0.0075 | 13.7 | 5.5 |
| A3 | Q3 | 11.3 | 1.16 | 4570 | 0.0077 | 14.2 | 15 |
| A4 | Q4 | 11.4 | 1.14 | 4320 | 0.0071 | 22.1 | 8.5 |
| A5 | Q5 | 11.3 | 1.19 | 4980 | 0.0072 | 5.7 | 2.0 |
| A6 | Q6 | 11.5 | 1.18 | 4650 | 0.0076 | 14.5 | 0 |
| A7 | Q7 | 11.1 | 1.14 | 4320 | 0.0071 | 23.4 | 0 |
| A8 | Q8 | 11.7 | 1.19 | 4980 | 0.0072 | 5.2 | 0 |
| A9 | Q9 | 11.5 | 1.15 | 4450 | 0.0069 | 14.6 | 3.0 |
| A10 | Q10 | 11.4 | 1.18 | 4630 | 0.0070 | 14.8 | 15 |
| A11 | Q11 | 11.3 | 1.15 | 4330 | 0.0071 | 22.5 | 8.5 |

Production of Isocyanate Group-Containing Urethane Prepolymer

Example B1

Into a 1 L reactor made of glass and equipped with a stirrer, 400 g of polyol Q1 was put. Deaeration under reduced pressure was carried out at 120° C. for 2 hours, and flushing with nitrogen was further carried out. Then, the polyol in the reactor was cooled to 40° C. Into the reactor, tolylene diisocyanate (mixture of 2,4-isomer and 2,6-isomer, containing 80 mass % of 2,4-isomer, trade name: TDI-80, manufactured by Nippon Polyurethane Kogyo KK) was put in an amount such that the NCO index became 200. While the content was stirred at a rotational speed of 100 rpm, the reactor was heated to 90° C. over a period of 30 minutes and then maintained at 90° C. for the reaction. For every predetermined time during the reaction, a part of the content was taken out, and the content z1 (mass %) of isocyanate groups was measured, whereupon the isocyanate reaction rate z (%) to the theoretical content $z_0$ (mass %) of isocyanate groups, was obtained. Upon confirming that the content $z_1$ (mass %) of isocyanate groups became at most the theoretical content $z_0$ (0.84 mass %) of isocyanate group, the reaction was terminated to obtain an isocyanate group-containing urethane prepolymer.

The relation between the reaction time (hr) and the isocyanate reaction rate z (%) is shown in FIG. 1. Further, the viscosity at 25° C. of the obtained isocyanate group-containing urethane prepolymer, and the viscosity after maintaining it at 80° C. for 24 hours, are shown in Table 2.

Examples B2 to B11

An isocyanate group-containing urethane prepolymer was produced in the same manner as in Example B1 except that the polyol as identified in Table 2 was used instead of polyol Q1. In the same manner as in Example B1, the relation between the reaction time (hr) and the isocyanate reaction rate z (%) is shown in FIG. 1. The viscosity at 25° C. of the obtained isocyanate group-containing urethane prepolymer and the viscosity after maintaining it at 80° C. for 24 hours, are shown in Table 2. Examples from B1 to B5 are working examples of the present invention, and Examples B6 to B11 are comparative examples.

TABLE 2

| Ex. | Polyol | Viscosity at 25° C. (mPa · s) | Viscosity after maintaining the prepolymer at 80° C. for 24 hours (mPa · s) |
|---|---|---|---|
| B1 | Q1 | 31000 | 31900 |
| B2 | Q2 | 29700 | 30500 |
| B3 | Q3 | 29200 | 30400 |
| B4 | Q4 | 31200 | 32600 |
| B5 | Q5 | 30300 | 31900 |
| B6 | Q6 | 38700 | 48000 |
| B7 | Q7 | 40200 | 54200 |
| B8 | Q8 | 36500 | 46200 |
| B9 | Q9 | 33400 | 38900 |
| B10 | Q10 | 39800 | 54500 |
| B11 | Q11 | 41000 | 48600 |

As is evident from FIG. 1, with Q1 to Q5 being the polyether polyol compositions of the present invention, the reaction with the polyisocyanate proceeds at a moderate speed, whereby it is easy to control the reaction. On the other hand, with Q6 to Q11, the reaction with the isocyanate proceeds rapidly, whereby it is difficult to control the reaction. Further, as is evident from Table 2, isocyanate group-terminated prepolymers prepared by using Q1 to Q5 being the polyether polyol compositions of the present invention, are excellent in storage stability, while it is evident that the isocyanate group-terminated prepolymers prepared by using Q6 to Q11, are poor in the storage stability, as the viscosity after the storage tends to increase.

The entire disclosure of Japanese Patent Application No. 2003-19062 filed on Jan. 28, 2003 including specification, claims, drawings and summary is incorporated herein by reference in its entirety.

What is claimed is:

1. A polyether polyol composition comprising:

a polyether polyol obtained by ring-opening polymerization of a propylene oxide in the presence of a composite metal cyanide complex catalyst, which polyether polyol has a metal content derived from said composite metal cyanide complex catalyst in an amount of from 1 to 30 ppm based on the polyether polyol; and 2 to 15 ppm based on the polyether polyol of at least one phosphoric acid compound selected from the group consisting of orthophosphoric acid, polyphosphoric acid and polymetaphosphoric acid, and/or a partial ester of such a phosphoric acid.

2. The polyether polyol composition according to claim 1, wherein the phosphoric acid compound is at least one member selected from the group consisting of orthophosphoric acid, an orthophosphoric acid monoalkyl ester, and an orthophosphoric acid dialkyl ester.

3. The polyether polyol composition according to claim 1, wherein the polyether polyol is produced by a process that does not include a step of removing the composite metal cyanide complex catalyst, after a ring-opening polymerization of a propylene oxide in the presence of said composite metal cyanide complex catalyst.

4. The polyether polyol composition according to claim 1, wherein the polyether polyol is produced by using the composite metal cyanide complex catalyst in such an amount that the metals derived from the composite metal cyanide complex catalyst range from 1 to 30 ppm based on the finally formed polyether polyol.

5. The polyether polyol composition according to claim 1, wherein the composite metal cyanide complex catalyst contains one or more compounds selected from the group consisting of tert-butyl alcohol, tert-pentyl alcohol and ethylene glycol mono-tert-butyl ether dioxane, as organic ligands.

6. A polyurethane resin obtained by reacting the polyether polyol composition of claim 1 with a polyisocyanate.

7. An isocyanate group-terminated prepolymer obtained by reacting the polyether polyol composition of claim 1 with a polyisocyanate.

8. A method for producing a polyether polyol composition, which comprises:

producing a polyether polyol by ring-opening polymerization of a propylene oxide in the presence of a composite metal cyanide complex catalyst in such an amount that the metals derived from the composite metal cyanide complex catalyst range from 1 to 30 ppm based on the finally formed polyether polyol, and then adding a phosphoric acid compound comprising a phosphoric acid selected from the group consisting of orthophosphoric acid, polyphosphoric acid and polymetaphosphoric acid, and/or a partial ester of such a phosphoric acid, in an amount of from 2 to 15 ppm based on the polyether polyol, without a step of removing the composite metal cyanide complex catalyst.

9. A method for producing a polyurethane comprising:

producing a polyether polyol by ring-opening polymerization of propylene oxide in the presence of a composite metal cyanide complex catalyst in such an amount that the metals derived from the composite metal cyanide complex catalyst would be from 1 to 30 ppm based on the finally formed polyether polyol, then adding a phosphoric acid compound comprising a phosphoric acid selected from the group consisting of orthophosphoric acid, polyphosphoric acid and polymetaphosphoric acid, and/or a partial ester of such phosphoric acid, in an amount of from 2 to 15 ppm based on the polyether polyol, without a step of removing the composite metal cyanide complex catalyst, to obtain a polyether polyol composition, and further reacting the polyether polyol composition with a polyisocyanate.

10. A method for producing an isocyanate group-terminated prepolymer comprising:

producing a polyether polyol by ring-opening polymerization of propylene oxide in the presence of a composite metal cyanide complex catalyst in such an amount that the metals derived from the composite metal cyanide complex catalyst would be from 1 to 30 ppm based on the finally formed polyether polyol, then adding a phosphoric acid compound comprising a phosphoric acid selected from the group consisting of orthophosphoric acid, polyphosphoric acid and polymetaphosphoric acid, and/or a partial ester of such phosphoric acid, in an amount of from 2 to 15 ppm based on the polyether polyol, without a step of removing the composite metal cyanide complex catalyst, to obtain a polyether polyol composition, and further reacting the polyether polyol composition with a polyisocyanate.

11. The polyether polyol composition of claim 1, wherein said phosphoric acid compound is orthophosphoric acid.

12. The polyether polyol composition of claim 1, wherein said phosphoric acid compound is polyphosphoric acid.

13. The polyether polyol composition of claim 1, wherein said phosphoric acid compound is polymetaphosphoric acid.

14. The polyether polyol composition of claim 1, wherein said phosphoric acid compound is a partial ester of orthophosphoric acid, polyphosphoric acid or polymetaphosphoric acid.

15. A polyether polyol composition containing:

2 to 15 ppm of at least one phosphoric acid compound selected from the group consisting of orthophosphoric acid, polyphosphoric acid and polymetaphosphoric acid, and/or a partial ester of such a phosphoric acid;

1 to 30 ppm of metal content derived from said composite metal cyanide complex catalyst;

which polyether polyol composition is produced by adding said at least one phosphoric acid to a polyether polyol after its production by ring-opening polymerization of a propylene oxide in the presence of a composite metal cyanide complex catalyst;

wherein the amount of the at least one phosphoric compound and the metal content is based on the amount of polyether polyol.

16. A polyether polyol composition comprising:

a polyether polyol, 1 to 30 ppm, based on the polyether polyol, metal content derived from a composite metal cyanide complex catalyst; and 2 to 15 ppm, based on the polyether polyol, of at least one phosphoric acid compound selected from the group consisting of orthophosphoric acid, polyphosphoric acid, and polymetaphosphoric acid; or partial esters thereof;

wherein said polyether polyol is obtained by ring-opening polymerization of propylene oxide in the presence of the composite metal cyanide complex catalyst and was not subject to a step of removing the metal catalyst after the ring-opening polymerization of the propylene oxide.

* * * * *

UNITED STATES PATENT AND TRADEMARK OFFICE

CERTIFICATE OF CORRECTION

PATENT NO. : 7,553,921 B2
APPLICATION NO. : 11/188888
DATED : June 30, 2009
INVENTOR(S) : Chitoshi Suzuki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 342 days.

Signed and Sealed this

Twenty-eighth Day of September, 2010

David J. Kappos
*Director of the United States Patent and Trademark Office*